United States Patent
Diab et al.

(10) Patent No.: US 7,777,636 B2
(45) Date of Patent: Aug. 17, 2010

(54) SYSTEM AND METHOD FOR CONTINUAL CABLE THERMAL MONITORING USING CABLE CHARACTERISTIC CONSIDERATIONS IN POWER OVER ETHERNET

(75) Inventors: Wael William Diab, San Francisco, CA (US); Mishine Shih, Irvine, CA (US); Scott Powell, Carlsbad, CA (US)

(73) Assignee: Broadcom Corporation, Irvine, CA (US)

( * ) Notice: Subject to any disclaimer, the term of this patent is extended or adjusted under 35 U.S.C. 154(b) by 597 days.

(21) Appl. No.: 11/693,011

(22) Filed: Mar. 29, 2007

(65) Prior Publication Data

US 2008/0238634 A1 Oct. 2, 2008

(51) Int. Cl.
*G08B 21/00* (2006.01)

(52) U.S. Cl. ..................................... 340/657

(58) Field of Classification Search .............. 340/657, 340/539.27, 539.3, 545.4; 455/522; 713/300, 713/324
See application file for complete search history.

(56) References Cited

U.S. PATENT DOCUMENTS

| 6,980,007 | B1 * | 12/2005 | Lo et al. | 324/543 |
| 7,593,747 | B1 * | 9/2009 | Karam et al. | 455/522 |
| 2006/0115007 | A1 * | 6/2006 | Karam et al. | 375/257 |
| 2007/0074052 | A1 * | 3/2007 | Hemmah et al. | 713/300 |
| 2007/0283173 | A1 * | 12/2007 | Webb et al. | 713/300 |

* cited by examiner

*Primary Examiner*—Phung Nguyen
(74) *Attorney, Agent, or Firm*—Duane S. Kobayashi (57) ABSTRACT

A system and method for continual cable thermal monitoring using cable characteristic considerations in Power over Ethernet (PoE) applications. Cable heating in PoE applications is detected through changes in electrical characteristics of the cable itself. By periodically monitoring the electrical characteristics such as insertion loss or cross talk of the cable, it can be determined whether the cable has exceeded certain thermal operating thresholds.

19 Claims, 7 Drawing Sheets

SYSTEM AND METHOD FOR CONTINUAL CABLE THERMAL MONITORING USING CABLE CHARACTERISTIC CONSIDERATIONS IN POWER OVER ETHERNET

BACKGROUND

1. Field of the Invention

The present invention relates generally to power over Ethernet (PoE) systems and methods and, more particularly, to the continual cable thermal monitoring using cable characteristic considerations for PoE applications.

2. Introduction

The IEEE 802.3af PoE standard provides a framework for delivery of power from power source equipment (PSE) to a powered device (PD) over Ethernet cabling. In this PoE process, a valid device detection is first performed. This detection process identifies whether or not it is connected to a valid device to ensure that power is not applied to non-PoE capable devices. After a valid PD is discovered, the PSE can optionally perform a power classification. IEEE 802.3af defines five power classes for a PD device. The completion of this power classification process enables the PSE to manage the power that is delivered to the various PDs connected to the PSE.

This PoE application is a relatively new application that is being applied to an existing cabling infrastructure. Significantly, this cabling infrastructure was not originally designed for the distribution of power. Accordingly, the provision of power over the cabling infrastructure can introduce unintended effects such as heat. This heat can be generated through the transmission of current in the cable itself or in surrounding cables. The dissipation of this heat can be constricted due to physical constraints such as conduits, poor air circulation, etc. PoE systems must account for this heat during operation. These considerations are likely to play an even greater role in the administration of high-power PoE systems such as that proposed by the IEEE 802.3at specification. What is needed therefore is a mechanism that enables the PoE system to account for the existence of heat in the cabling infrastructure in an active manner.

SUMMARY

A system and/or method for continual cable thermal monitoring using cable characteristic considerations, substantially as shown in and/or described in connection with at least one of the figures, as set forth more completely in the claims.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
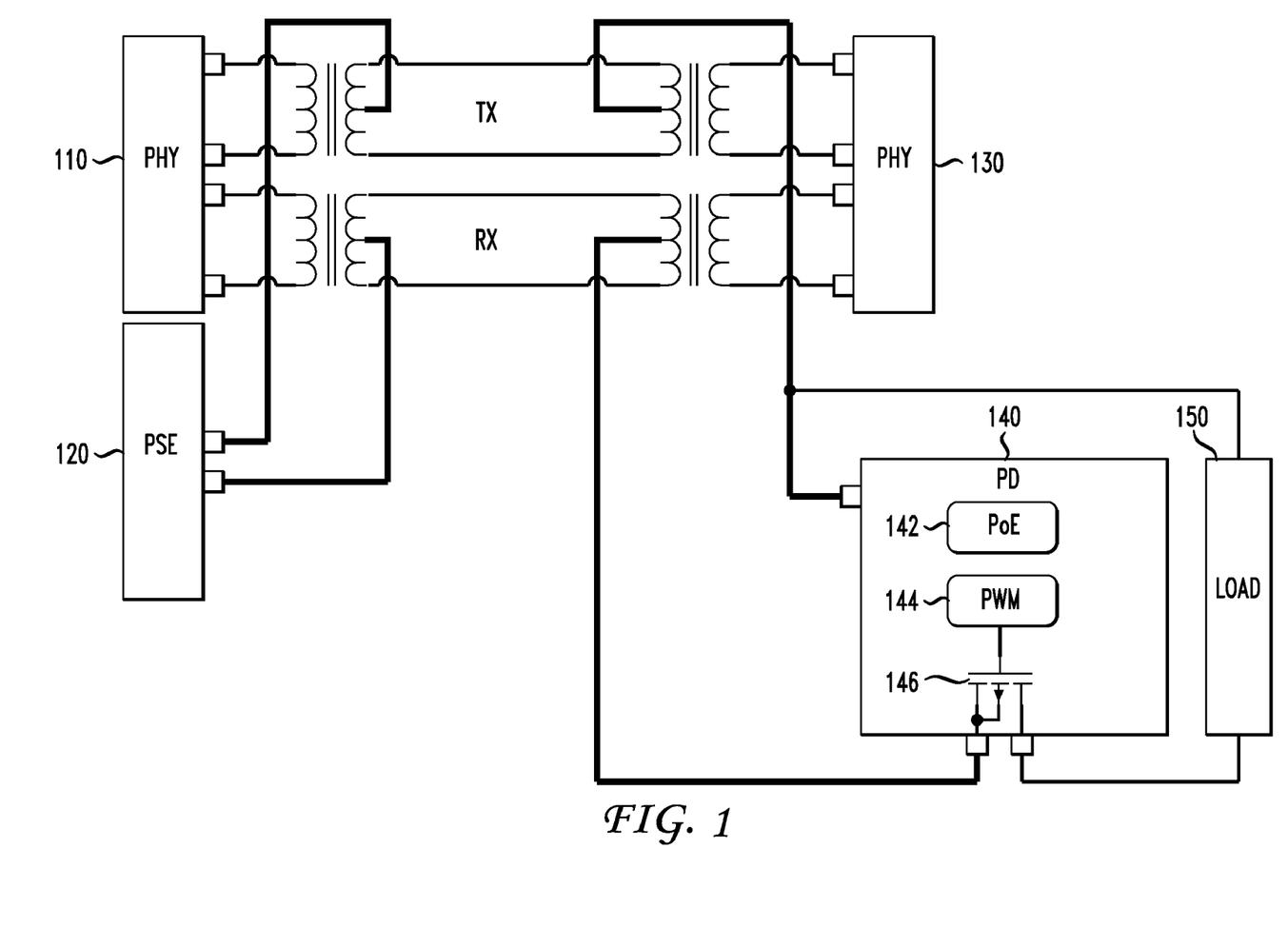
FIG. 1 illustrates an embodiment of a Power over Ethernet (PoE) system.

FIG. 1 illustrates an embodiment of a power over Ethernet (PoE) system. As illustrated, the PoE system includes power source equipment (PSE) 120 that transmits power to powered device (PD) 140. Power delivered by the PSE to the PD is provided through the application of a voltage across the center taps of transformers that are coupled to a transmit (TX) pair and a receive (RX) pair of wires carried within an Ethernet cable. The two TX and RX pairs enable data communication between Ethernet PHYs 110 and 130.

As is further illustrated in FIG. 1, PD 140 includes PoE module 142. PoE module 142 includes the electronics that would enable PD 140 to communicate with PSE 120 in accordance with a PoE standard such as IEEE 802.3af, 802.3at, etc. PD 140 also includes pulse width modulation (PWM) DC:DC controller 144 that controls power FET 146, which in turn provides constant power to load 150. As would be appreciated, FET 146 could optionally be integrated with PWM controller 144.

In the IEEE 802.3af standard, each wire conductor has a specified current limit of 175 mA, resulting in a total specified current limit of 350 mA. The net effect of the passage of such current through the wire conductor is the generation of heat. This heat can have a significant impact on the operation of the PoE system.

For example, PoE systems can be designed for operation up to an ambient temperature of 45° C. In one example, if a 45° C. ambient temperature is exceeded, the PoE system can be designed to lower the current limit until a 60° C. ambient temperature is reached, at which point power would cease to be applied. These scenarios can occur in typical installations, especially when cables are bundled together. Heat can therefore significantly impact the operation of a PoE system. This impact will be felt to an even greater degree as higher power PoE+ systems, as outlined in the IEEE 802.3 at specification, are introduced.

In higher power PoE+ applications, the first order constraint on how much current can be carried by the cabling system is the amount of heat the system experiences. This results because the heat has a direct effect on safety and the long-term life expectancy of the cable itself. Additionally, excess heat can also lead to the degradation of the data transmission capabilities of the cable. In general, because cabling systems are in very diverse environments, the heating effects can come from a variety of sources: heat generated within the cable itself, the environment temperature, the restriction in airflow in the environment (like conduits), neighboring cabling, etc.

As noted, the bundling of cables can create significant heat issues. For example, it is not uncommon to see massive bundles of cables (e.g., 90-150) leaving a data center or wiring closet. Moreover, conduits that may be within environmental constraints experience very limited airflow, thereby exacerbating the high temperature impact.

One of the concerns of these higher power PoE+ systems is the impact of overly conservative temperature restrictions that are derived from worst-case operating conditions. These overly conservative temperature restrictions can significantly reduce the legitimate operating margins of those PoE+ systems.

It is therefore a feature of the present invention that temperature can be monitored indirectly via measured cable characteristics (e.g., insertion loss, cross talk, etc.) on a per port/channel basis to facilitate greater granularity in the monitoring process. This enables the temperature analysis to consider operating conditions on individual ports/channels instead of relying on overly broad measures such as ambient temperature. Indeed, one of the goals of a per port/channel temperature analysis is to ensure that an imposition of a current limitation or power consumption restriction on a port/channel is only performed when necessary, i.e., when heat is actually starting to degrade performance of the cable on that PoE channel.

Figure 2:
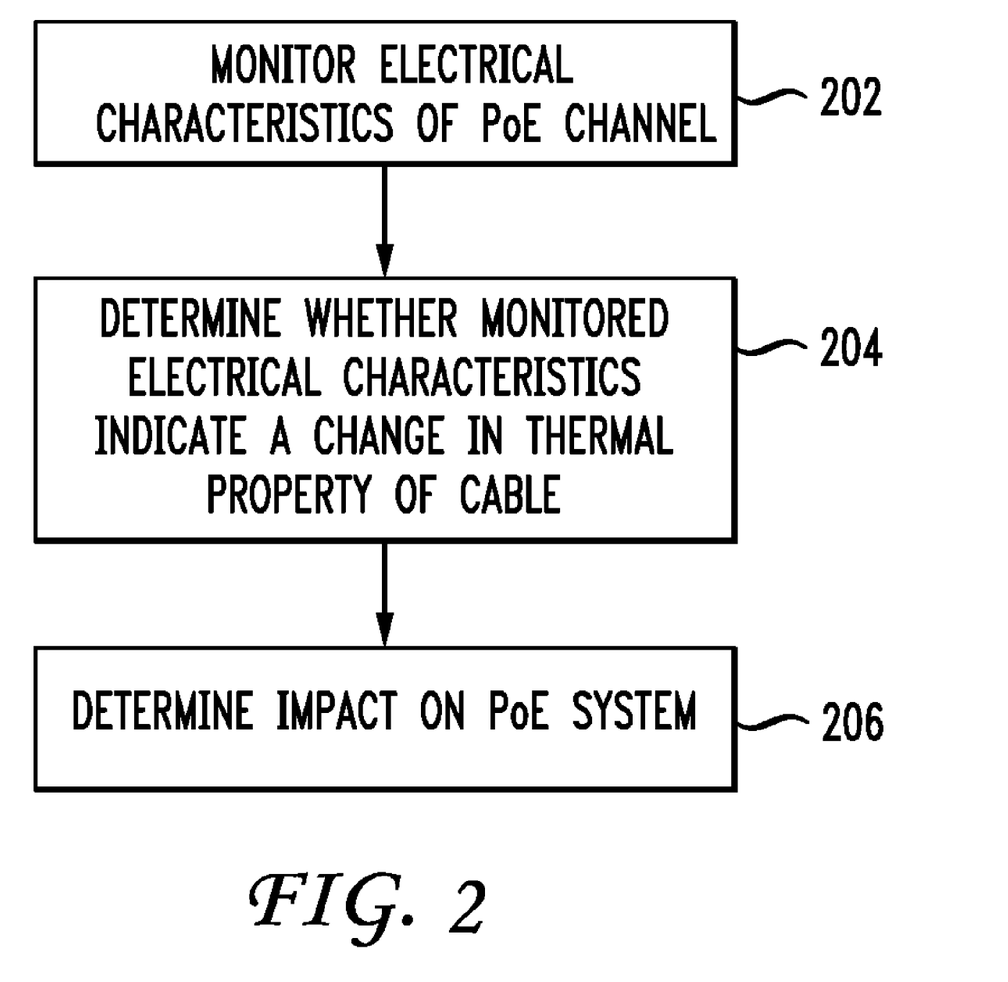
FIG. 2 illustrates a flowchart of a process for monitoring temperature in a PoE system.

To illustrate this general process of the present invention, reference is made to the flowchart of FIG. 2. As illustrated, the process begins at step 202, where one or more electrical characteristics of a cable are monitored. These electrical characteristics would be measured periodically during the provision of power on the particular PoE channel.

At step 204, it is determined whether the monitored electrical characteristics indicate a change in the thermal property of the cable on the PoE channel. As will be described in greater detail below, this analysis can be performed by either the PSE or the PD that is coupled to the PoE channel. As the electrical characteristics (e.g., insertion loss, cross talk, etc.) of the cable can be correlated to the temperature of the cable, the monitoring of the actual electrical characteristics during active powering of a PD would enable the PoE system to determine whether the thermal characteristic of the cable has changed over time. Monitoring such a change of the electrical characteristics would thereby enable the PoE system to determine a corresponding change in the temperature of the cable. In other words, the electrical characteristics of the cable on a PoE channel is a proxy for the temperature of the cable on that PoE channel.

At step 206, the determined change in temperature of the cable is analyzed to determine a potential impact on the PoE system. In various embodiments, the potential impact could consider a change in operation of a single PoE channel, or a group of PoE channels. For example, if the determined change in temperature indicates that a given cable has reached a temperature that is above an allowable threshold (e.g., 45° C., 60° C., etc.), then the PSE could choose to reduce or cut the power being applied to that PoE channel. In another example, the PSE could choose to reduce or cut the power being applied to a group of PoE channels, if it is known that the heat in a given cable could impact the operation of other cables, for example, where the cables are bundled together. In yet another example, the PD could choose to reduce or cut power consumption if the PD determines that the cable has reached a temperature above an allowable threshold.

As would be appreciated, the particular impact of an identified temperature change of a cable can vary depending on the application. Here, it is a feature of the present invention that the identified temperature change can be determined during operation on a per channel basis and used by the PoE system in a dynamic configuration or operation process.

As noted above, one or more characteristics of the Ethernet cable can be measured to enable the PoE system to monitor the temperature of the Ethernet cable. In various embodiments, the PoE system can be designed to measure such characteristics as the insertion loss, cross talk, length, etc. of the Ethernet cable. The measurement of insertion loss, cross talk, length, etc. of the Ethernet cable represent examples of different characteristics that can be used to monitor the temperature of the cable.

Electrical signals traveling down the cable attenuate differently depending on the cable. The insertion loss is a function of both frequency and cable length and is well defined for a cable. To measure insertion loss, the system can transmit one, multiple or continuous pulses with pre-determined frequency components into the cable. At the receiving end, the system can measure the magnitude attenuation and phase distortion, then combine this information with cable length.

Figure 3:
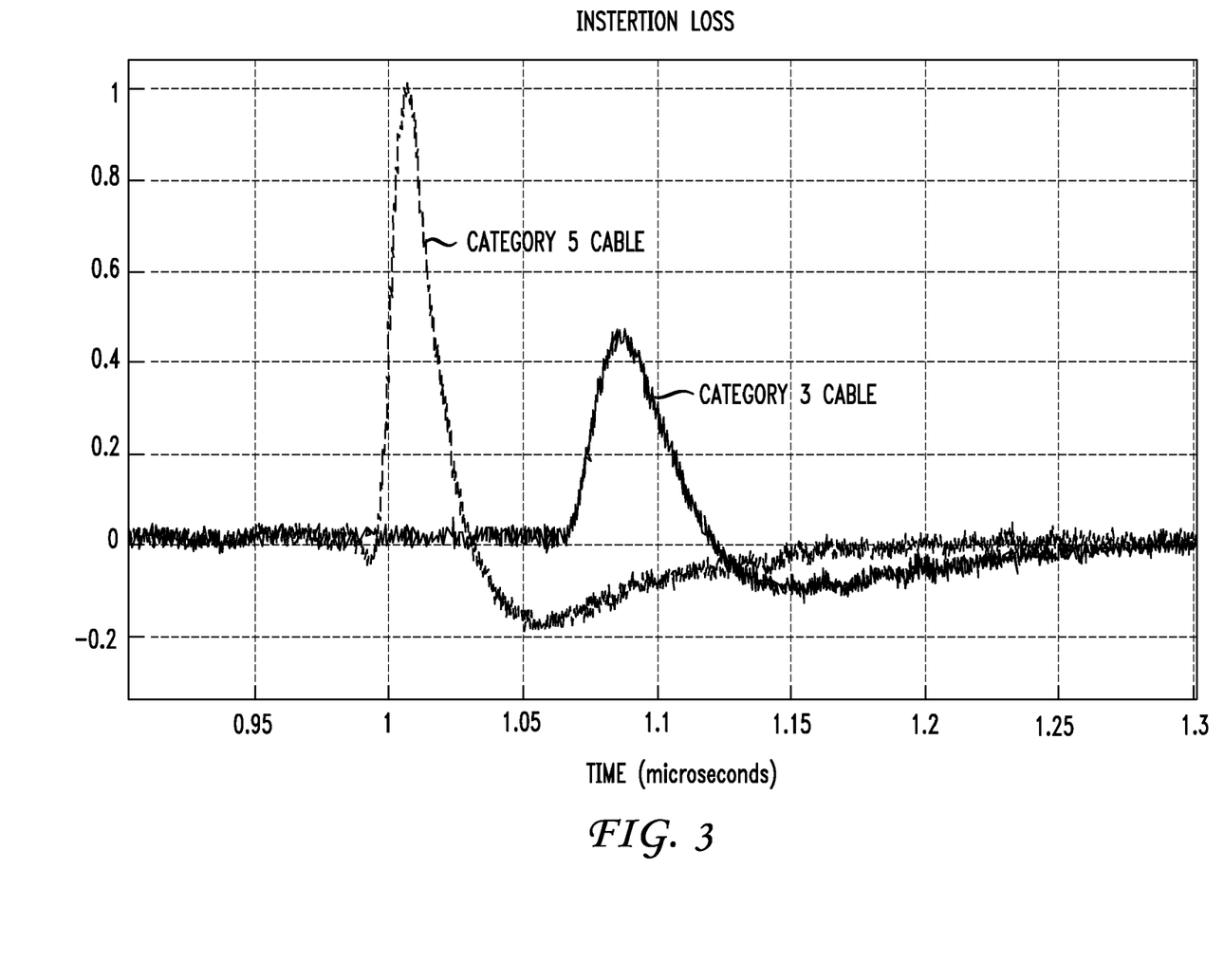
FIG. 3 illustrates an example of insertion loss measurements.

In one embodiment, the link partner can be powered off and the cable pair can be disconnected either on the line side of the transformer or on the opposite (transceiver) side of the transformer. In this case, almost all of the incidental pulse(s) are reflected back to the transmitting end with the same polarity, and the pulse(s) undergoes insertion loss corresponding to twice the cable length. FIG. 3 illustrates an example of insertion loss that can be measured for two different cable types of the same length.

Figure 4:
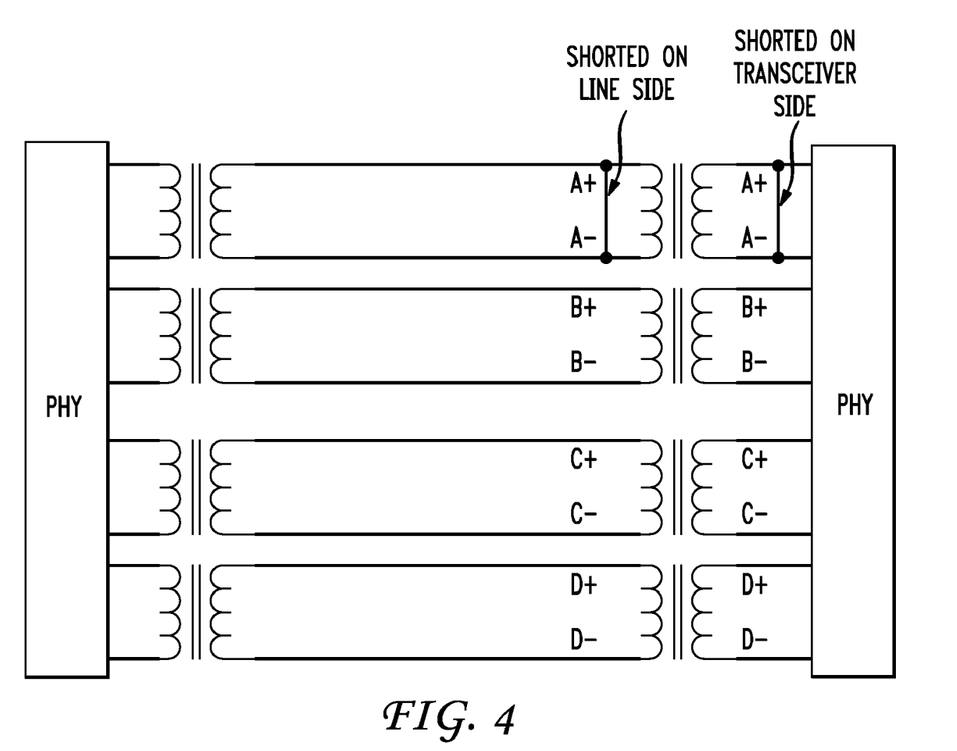
FIG. 4 illustrates a cable that can be shorted either on the line side or transceiver side of the transformer.

In another embodiment, the link partner can be powered off and the cable pair is shorted either on the line side of the transformer or on the opposite (transceiver) side of the transformer. This is illustrated in FIG. 4 where A+ is shorted to A−. In this case, almost all of the incidental pulse(s) are reflected back to the transmitting end with the opposite polarity, and the pulse(s) undergoes insertion loss corresponding to twice the cable length.

In another embodiment, the link partner can be powered off and two cable pairs are disconnected and shorted to the other pair to form a loop (e.g., A+ shorted to B+ and A− shorted to B−). This can happen on either the line side of the transformer or on the opposite (transceiver) side of the transformer. In this case, almost all of the incidental pulse(s) are routed back to the transmitting end in a different pair, and the pulse(s) undergoes insertion loss corresponding to twice the cable length.

In another embodiment, the link partner can be temporarily powered on to transmit pre-determined pulse(s). In this case, the pulse(s) undergoes insertion loss corresponding to the cable length.

Regardless of the method of measurement, the end result is a insertion loss measure such as that exemplified in FIG. 3. As the temperature of the cable changes, the measured insertion loss would also change. In the context of FIG. 3, for example, the pulse in the insertion loss curve could change with temperature (e.g., changes in the magnitude of the pulse peak, the location of the pulse peak, the width of the pulse, etc.). Monitoring the changes in the insertion loss measurement can therefore be correlated to a temperature change in the cable itself. Significantly, this type of cable monitoring is based on the entire channel, not just a localized measurement such as a hot spot.

Cross talk is similar to insertion loss in that different cable types conform to their own standards defining cross talk over a range of frequencies. Electrical signals traveling down the cable injects noise to adjacent pairs differently with respect to the cable type. The cross talk is a function of both frequency and cable length and is well defined for a cable. Here, the system can be designed to transmit one, multiple or continuous pulses with pre-determined frequency components into the cable. At the receiving end, the system can measure the magnitude attenuation and phase distortion, then combine this information with cable length.

Figure 5:
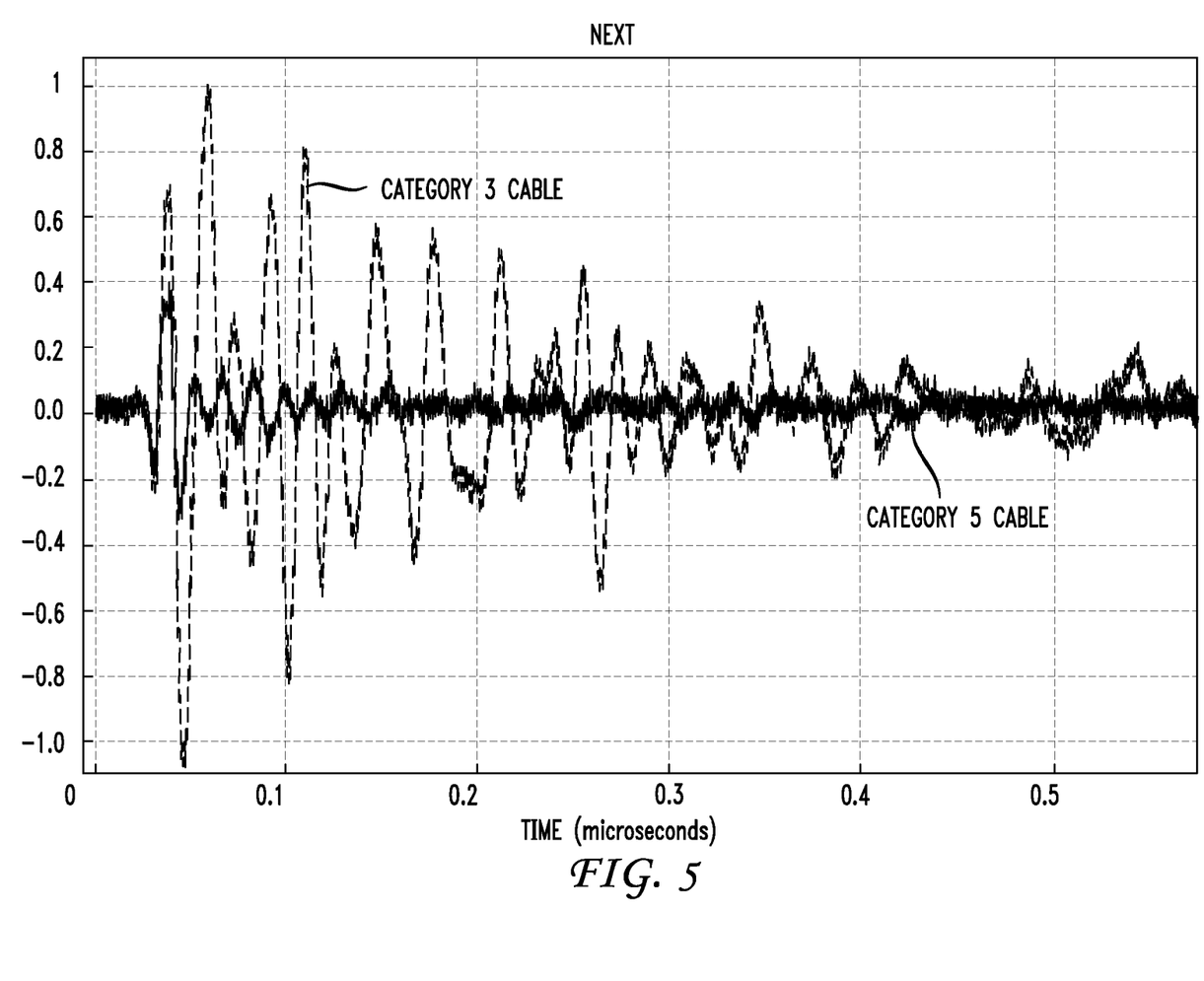
FIG. 5 illustrates an example of near end crosstalk measurements.

There are two types of cross talk: Near-end Cross Talk (NEXT) and Far-end Cross Talk (FEXT). For NEXT the noise injection comes from one or multiple local transmitters, while for FEXT the noise injection comes from one or more remote transmitters. Either NEXT or FEXT or a combination can be used. FIG. 5 illustrates an example of NEXT that can be measured for Category 3 and Category 5 cable.

As the temperature of the cable changes, the cross talk measurement also changes. In the context of FIG. 5, for example, the measurement illustrated in the cross talk response curve could change with temperature (e.g., changes in the magnitude of the response, shape of the curve envelope, etc.). Monitoring these changes can then be correlated to a temperature change in the cable itself.

As has been described, various cable characteristic measurements can be used to monitor the temperature of the cable. As would be appreciated, other characteristics beyond those described above could also be used to monitor the temperature of the cable. Regardless of the measurement data that is used, it is significant that the PoE system can use the data to adjust some aspect of configuration or operation of the PoE system dynamically.

Figure 6:
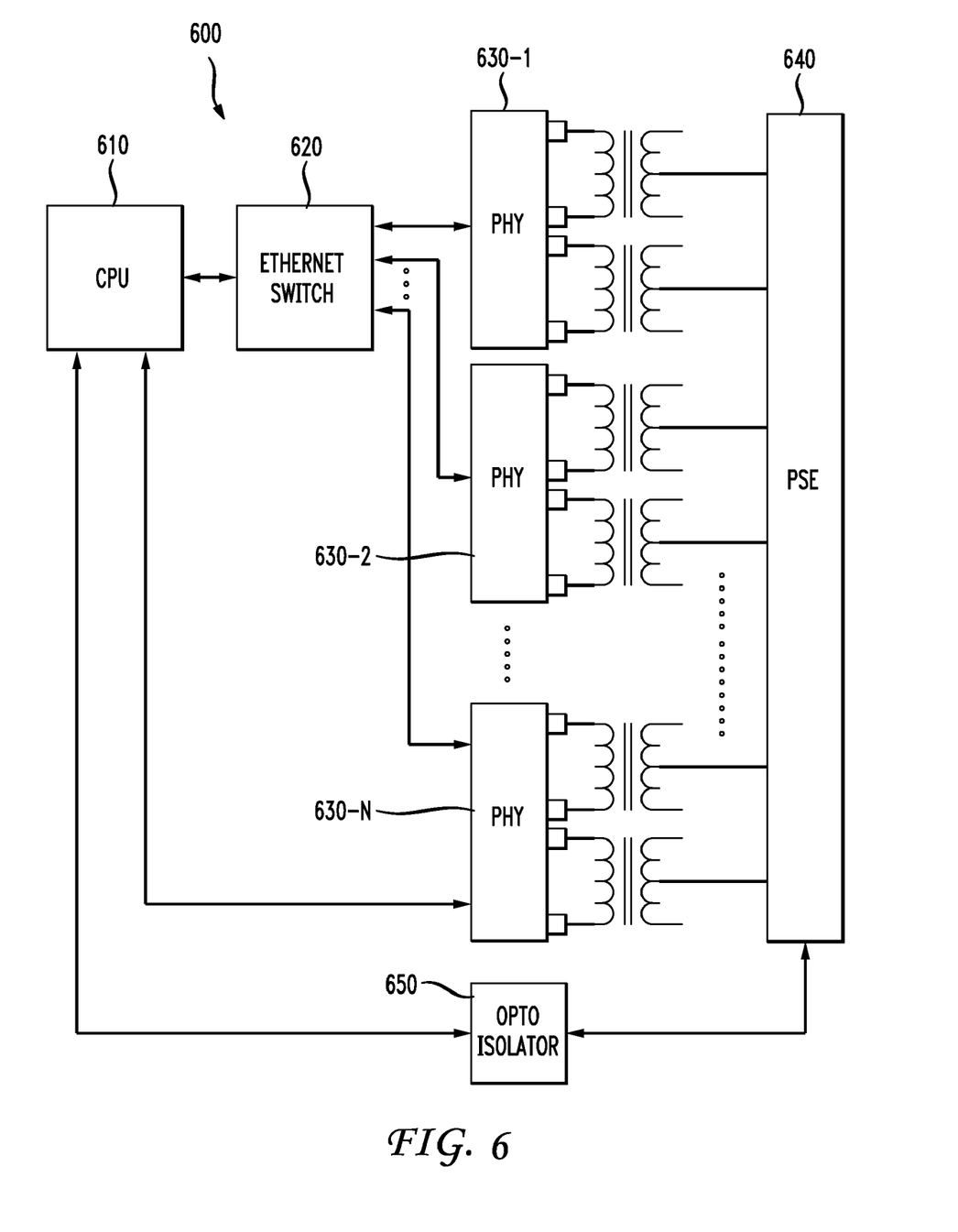
FIG. 6 illustrates an embodiment of a system that enables communication of cable characteristic information from a PHY to a PSE.

FIG. 6 illustrates an embodiment of a PoE environment 600 in which the principles of the present invention can be implemented. As illustrated, environment 600 includes PHYs 630-1 to 630-N that are each connected to Ethernet switch 620. While a PHY can include one or more Ethernet transceivers, the wiring for only a single transceiver is illustrated as being connected to PHY 630-N. As would be appreciated, a PHY can be discrete or integrated as part of Ethernet switch 620. Each PHY is also connected to CPU 610, although only a single connection from CPU 610 to PHY 630-N is shown for simplicity. In one embodiment, CPU 610 is incorporated along with Ethernet switch 620 and PHYs 610-1 to 610-N on a single chip. In another embodiment, Ethernet switch 620 and PHYs 610-1 to 610-N are incorporated on a single chip separate from CPU 610, wherein communication with CPU 610 is enabled via a serial interface. Also illustrated in PoE environment 600 is a PSE 640 that provides power through the center taps of the transformers shown. As illustrated, PSE 640 is also coupled to CPU 610 via opto-isolator 650 that facilitates an isolation boundary.

Figure 7:
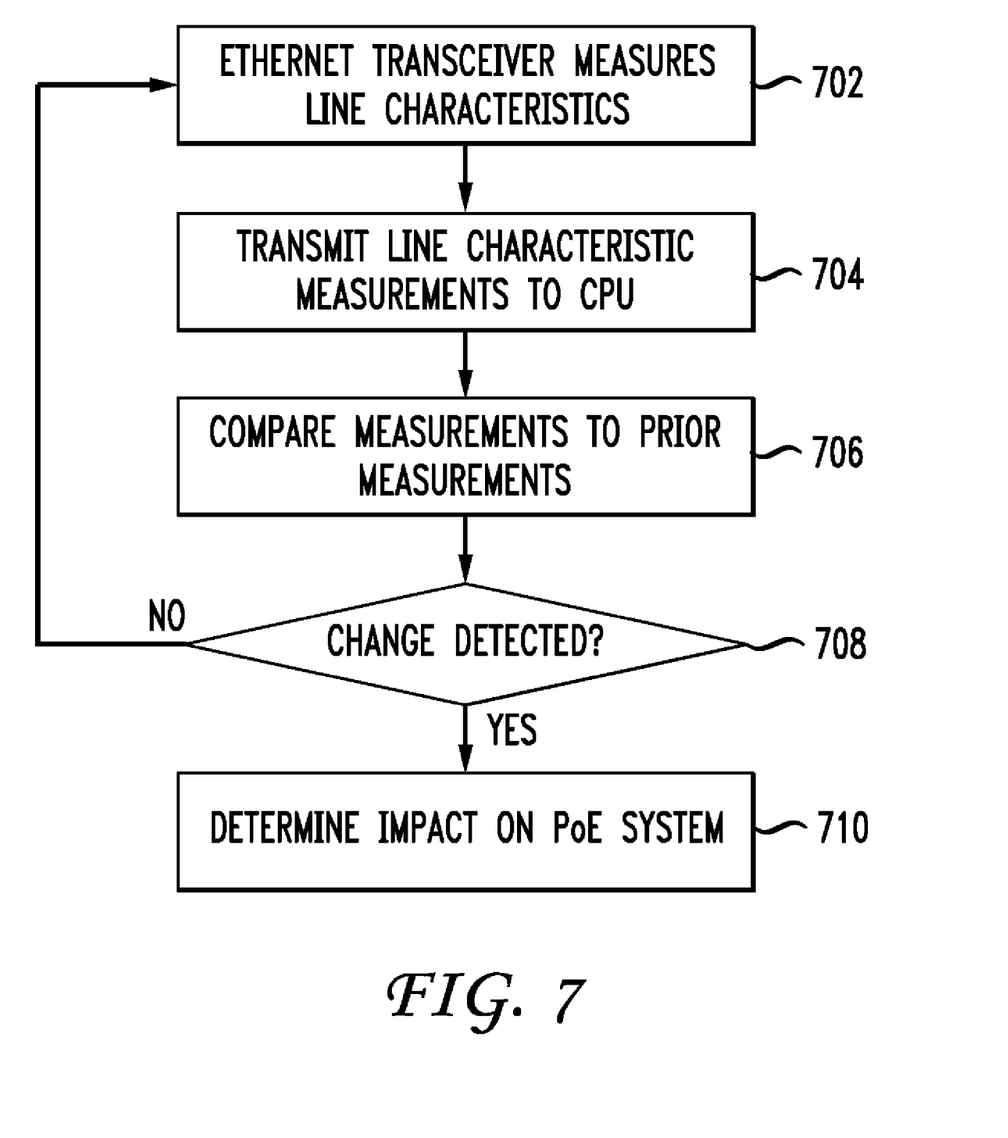
FIG. 7 illustrates a flowchart of a process for monitoring temperature in a PSE port.

To illustrate the operation of PoE environment 600 in implementing the principles of the present invention, reference is now made to the flowchart of FIG. 7. As illustrated, the flowchart of FIG. 7 begins at step 702 where a transceiver in PHY 630-N measures line characteristics of an Ethernet cable coupled to PHY 630-N. In one embodiment, measurements that enable a determination of insertion loss, cross talk, and cable length are taken during an echo canceller convergence process performed by an echo canceller module under control of CPU 610. Line characteristic measurements taken by the transceiver are then transmitted to CPU 610 at step 704. It should be noted that in an alternative embodiment, the line characteristic measurements could also be taken by the Ethernet transceiver at the PD either alone or in combination with the transceiver in PHY 630-N. If required, communication between the PD and the PHY can occur via a Layer 1 scheme, such as voltage and/or current modulation, Layer 2 (packets), Layer 3 (packets) or any such combination. Packets may be a standard protocol such as Ethernet, LLDP, OAM, or a proprietary system over these protocols.

Next, at step 706, the line characteristic measurements are compared to one or more previous line characteristic measurements. In one embodiment, the comparison is performed by CPU 610. In another embodiment, the comparison is performed by PSE 640, which receives the line characteristic measurements from CPU 610. Regardless of where the comparison is performed, its availability to PSE 640 would enable PSE 640 to determine its impact on the PoE system configuration and/or operation as described below. As noted, the comparison could also be performed at the PD.

In one embodiment, the line characteristic measurements are compared to the previous line characteristic measurements. In another embodiment, the line characteristic measurements are compared to baseline line characteristic measurements such as those obtained at or around the onset of powering of the PD. Here, the differential change in line characteristic measurements could be correlated to the increased heat caused by the PoE system operation. In yet another embodiment, the line characteristic measurements can be analyzed in the context of multiple prior line characteristic measurements as part of a trend analysis algorithm.

In general, the line characteristic measurements are used as a proxy for the temperature of the cable. Accordingly, the comparison process of step 706 could alternatively be performed on data that is derived from the line characteristic measurements. For example, the line characteristic measurements could be used to derive some characteristic of a pulse, curve envelope, etc. In this example, the comparison process of step 706 could be performed on the derived characteristic directly instead of on the proxy line characteristic measurements.

Regardless of the particular methodology of comparison or analysis, at step 708, it is then determined whether a change has been detected. As noted, this change can be measured on the line characteristic measurements themselves or on another characteristic derived from the line characteristic measurements. If no change is detected at step 708, then the process would loop back where further measurements are taken by the Ethernet transceiver. In this periodic monitoring process, the delay between measurements can be implementation dependent. For example, the delay between measurements can range from fractions of a second to tens of seconds or more. Here, the determined delay can be chosen to provide the system operator with any desired granularity of monitoring.

If a change is detected at step 708, then an impact on the PoE system is determined at step 710. In one embodiment, the determination at step 710 can be based on one or more thresholds that are designed to determine whether the change is significant or not. In one embodiment, a detected change under a predefined threshold could be used to generate an alert that signals that further scrutiny of that port is warranted. For example, the generated alert could dictate that the monitoring frequency of that PoE channel be increased.

In other embodiments, a detected change that exceeds a certain threshold can be designed to produce an action of the operation of that PoE channel. For example, a detected change above a first threshold could lead to certain current limitations being imposed, while a detected change above a second threshold could lead to power being cut off on that channel. In another example, a detected change above a threshold by a PD could lead to a PD lowering its power consumption. As would be appreciated, the specific actions that are taken in response to certain detected changes in step 710 would be implementation dependent.

In one embodiment, the absence of a detected change could also produce a change in the PoE system. For example, if it is determined that no change has been detected, then the PoE system could choose to increase the current threshold on that channel. In other words, the PoE system could choose to dynamically increase the threshold output current on a channel until there are indications that heat has become an issue. In this manner, the PoE system can be designed to increase current thresholds beyond worst-case design specifications.

In one embodiment, a measured change in a line characteristic can be used to calculate a temperature of the cable. For example, assume it is known that the insertion loss for an unshielded twisted pair moves predictably with temperature such that it changes at approximately 0.4% per degree C. in the 20° C.-40° C. range (i.e., approximately 8% over the range), and changes at approximately 0.6% per degree C. in the 40° C.-60° C. range (i.e., approximately 12% over the range). With knowledge of this correlation between insertion loss and temperature changes, the system can back calculate the temperature of the cable given the measured insertion loss. The system can then determine what is an allowable increase for PoE given the measured insertion loss and considering worst-case specifications.

It should also be noted that the actions taken by the PSE or PD need not be confined to a single channel. While the analysis can be performed on a per channel basis, the subsequent impact can be broader and affect multiple channels. For example, an indication of a high temperature on a first cable could dictate that a second cable would also be at risk, if for example, similarities between the first and second cable existed. The particular types of similarities can range in scope as would be appreciated. For example, it may be known that the first cable is in close proximity to a second cable, such as being in the same conduit. In another example, it may be known that the first and second cable have been operating at similar current levels for a period of time. In general, any basis that would enable the PoE system to infer that a detected heat condition in a first cable could also occur in a second cable would be valuable in determining an impact on PoE system operation.

One of the benefits of the present invention is that the temperature monitoring does not rely on probes at different points in the cable. Monitoring based on these probe measurements is not sufficient to guarantee that there isn't a problem on a particular section of the cable. For example, the cable may have a "hot spot" in a section of the cable that lies within a hot conduit.

Finally, it should be noted that the principles of the present invention can be applied to any form of network cabling, whether standard Ethernet cabling (e.g., Category 3, 5, 6, etc.) or to non-standard cabling such as Type-II cabling.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A power over Ethernet system, comprising:
   a powered device detection component that detects a presence of a powered device, said powered device coupled to a power source equipment port via an Ethernet cable; and
   a power controller that controls power allocation to said power source equipment port based on a temperature change in said Ethernet cable that is identified using measurements of an electrical characteristic of said Ethernet cable taken by a physical layer device, said measurements being taken in response to one or more pulses being transmitted into said Ethernet cable.

2. The power over Ethernet system of claim 1, wherein said measurements are taken periodically by said physical layer device.

3. The power over Ethernet system of claim 1, wherein said temperature change is identified by a change in said measurements over time.

4. The power source equipment of claim 3, wherein said change in said measurements of said electrical characteristic is identified by the power over Ethernet system.

5. The power source equipment of claim 1, wherein said electrical characteristic is insertion loss.

6. The power source equipment of claim 1, wherein said electrical characteristic is cross talk.

7. A power over Ethernet method, comprising:
   after allocating power to a powered device coupled to a power source equipment via an Ethernet cable, measuring one of insertion loss or cross talk of said Ethernet cable of said Ethernet cable to produce first measurement data;
   at a subsequent time, measuring said electrical characteristic of said Ethernet cable to produce second measurement data;
   determining whether an analysis of said first measurement data and said second measurement data indicates a change in temperature of said Ethernet cable; and
   controlling power transferred to said powered device based on said determination.

8. The method of claim 7, wherein said determining comprising determining whether a comparison of said first measurement data and said second measurement data indicates a change in temperature of said Ethernet cable.

9. The method of claim 7, wherein said measuring comprises measuring by a physical layer device.

10. The method of claim 7, wherein said measuring comprises measuring by a physical layer device during an echo cancellation process.

11. The method of claim 7, further comprising transmitting measurement data to a power over Ethernet system for said analysis.

12. The method of claim 7, wherein said wherein said controlling comprises changing a current threshold at said power source equipment.

13. The method of claim 7, wherein said controlling comprises changing a power consumption at said powered device.

14. A power over Ethernet method, comprising:
   periodically measuring, in response to one or more pulses being transmitted into an Ethernet cable that couples a powered device to a power source equipment port, an electrical characteristic of said Ethernet cable;
   determining whether an analysis of electrical characteristic data of said Ethernet cable taken at different measurement times indicates a change in temperature of said Ethernet cable; and
   reducing a current threshold for said power source equipment port if it is determined that a change in temperature has occurred.

15. The method of claim 14, wherein said measuring comprises measuring insertion loss of said Ethernet cable.

16. The method of claim 14, wherein said measuring comprises measuring cross talk of said Ethernet cable.

17. The method of claim 14, further comprising generating an alert signal if a change in temperature is indicated.

18. The method of claim 14, further comprising increasing a current threshold at said power source equipment if it is determined that no change in temperature is indicated.

19. The method of claim 14, further comprising reducing a current threshold at said power source equipment if it is determined that a change in temperature is indicated.

* * * * *